United States Patent
Mitchell

(10) Patent No.: US 7,036,809 B1
(45) Date of Patent: May 2, 2006

(54) CUTTING BOARD HOLDER

(75) Inventor: William F. Mitchell, Bodega Bay, CA (US)

(73) Assignee: Cataluna Enterprises, Inc., Minneapolis, MN (US)

( * ) Notice: Subject to any disclaimer, the term of this patent is extended or adjusted under 35 U.S.C. 154(b) by 0 days.

(21) Appl. No.: 11/036,607

(22) Filed: Jan. 13, 2005

(51) Int. Cl.
*B23Q 3/00* (2006.01)

(52) U.S. Cl. .............. 269/289 R; 269/302.1

(58) Field of Classification Search .......... 269/289 R, 269/302.1, 302
See application file for complete search history.

(56) References Cited

U.S. PATENT DOCUMENTS

| | | | |
|---|---|---|---|
| 5,382,009 A | 1/1995 | Mertz et al. | |
| 5,626,067 A * | 5/1997 | Lothe | 83/761 |
| 5,865,105 A * | 2/1999 | Pepelanov | 99/446 |
| 5,984,294 A | 11/1999 | Bogomolny | |
| 6,164,478 A * | 12/2000 | Cant | 220/62.1 |
| 6,422,551 B1 * | 7/2002 | Brotz | 269/289 R |
| 6,460,699 B1 | 10/2002 | McGregor | |
| 6,536,753 B1 | 3/2003 | Keener | |
| 6,644,639 B1 | 11/2003 | Newton | |
| 6,651,970 B1 | 11/2003 | Scott | |
| 2002/0195763 A1 * | 12/2002 | Benjamin | 269/289 R |

OTHER PUBLICATIONS

Linda J. Harris, "Microbial Pathogens Associated with Produce", *Perishables Handling Quarterly Issue No. 91*, Aug. 1997, pp. 2-3.

* cited by examiner

*Primary Examiner*—Lee D. Wilson
(74) *Attorney, Agent, or Firm*—Patterson, Thuente, Skaar & Christensen, P.A.

(57) ABSTRACT

A cutting board kit having a cutting board holder capable of securely receiving two or more cutting boards. The cutting boards may be designated for use with specific classes of food products.

13 Claims, 4 Drawing Sheets

CUTTING BOARD HOLDER

FIELD OF THE INVENTION

The present invention relates to a holder for securely holding two or more cutting boards wherein the cutting boards held are all visible within the holder and may be designated for use with specific classes of food products.

BACKGROUND OF THE INVENTION

Preparation of food items often requires a preparation step in which a food item is cut using a knife or other sharpened kitchen tool. The preparation step may involve cutting a serving portion from a larger portion of a food item, such as a slice of cooked meat product. The preparation step may alternatively involve preparation of multiple smaller size pieces from a food item, such as a vegetable, by an operation such as chopping, dicing, or slicing.

These steps may be carried out on a counter top or other flat permanent surface in a kitchen or other food preparation area. These steps may also be carried out on flat temporary surfaces referred to as cutting boards. The use of cutting boards allows for the cutting, chopping, etc. to be accomplished in many areas of the kitchen while protecting permanent surfaces from disfiguration from cutting tools or from fluids released from a food item during the processing step. The use of the cutting board may also assist in the transfer of the food item to a cooking vessel. Finally, cutting boards are susceptible of being cleansed in a dishwasher allowing for convenience in cleaning after food preparation and potentially reducing risk from microbial hazards.

Despite their convenience, cutting boards may present a health risk if not properly cared for and cleansed. Raw produce may present various bacterial pathogens such as *Shigella* sp., *E. coli* sp. (including *E. coli* 0157H7), *Salmonella* sp. and viral pathogens such as Hepatitis A. The levels of these pathogens on produce can often be reduced to a level that will not affect most individuals by rinsing affected produce with fresh water shortly before serving. However, residual amounts of pathogen may be transferred to a surface where produce is placed in the food preparation process such as a cutting board. Proper cleansing of the surface can prevent any pathogen so deposited from contaminating other foods.

In the case where surfaces are not cleansed properly, pathogens may be transferred to other foods that are prepared on the same surface. This cross contamination of foods is particularly an issue where the food that is contaminated is stored in a way that allows the pathogen in the contaminated food to multiply to the point where it can cause illness in a person consuming the contaminated food.

Raw meat and processed meat products may present bacterial pathogens such as *E. coli* (including *E. coli* O157: H7), *Salmonella* sp., *Campylobacter jejuni* and *Listeria monocytogenes*. Careful preparation of raw meat and processed meat products can prevent these potential pathogens from causing illness as a result of eating the meat or meat product. However, it is important that cutting boards used in preparation of meat and meat products be cleansed properly between uses to prevent cross contamination of food products, thereby further reducing the risk of food-borne illness. It is especially important that pathogens present in meat products that would be killed or inactivated during normal cooking not be transferred to foods that are raw or already cooked.

To prevent this transfer, health authorities, food companies and others recommend having cutting boards dedicated for use with certain types of food products during food preparation. For example, in a kitchen a cook may prepare vegetables, breads, fruits and meats for one meal thereby requiring up to four different cutting boards in the course of preparing a meal. Increasingly, health authorities and food companies also recommend that cutting boards be permanently dedicated to one food type or at the very least food preparers should ensure that a cutting board used to for preparation of raw and processed meats only be used for such foodstuffs.

It would therefore be useful to have a cutting board kit for storage of multiple cutting boards. It would also be useful to have the various dedicated cutting boards permanently labeled to ensure consistent use by all personnel using the same kitchen facility.

SUMMARY OF THE INVENTION

The present invention relates to a cutting board kit having a cutting board holder capable of securely holding two or more cutting boards within. The cutting board holder may secure the cutting boards about the perimeter of the cutting boards and may partially or wholly enclose the cutting boards. The cutting boards may be labeled (for example, "Vegetable", "Produce", "Meat", "Bread", "Fruit" and the like) to ensure consistent usage by multiple users of the cutting boards. The boards may arranged to allow for selective storage and removal.

DETAILED DESCRIPTION OF THE INVENTION

Figure 1:
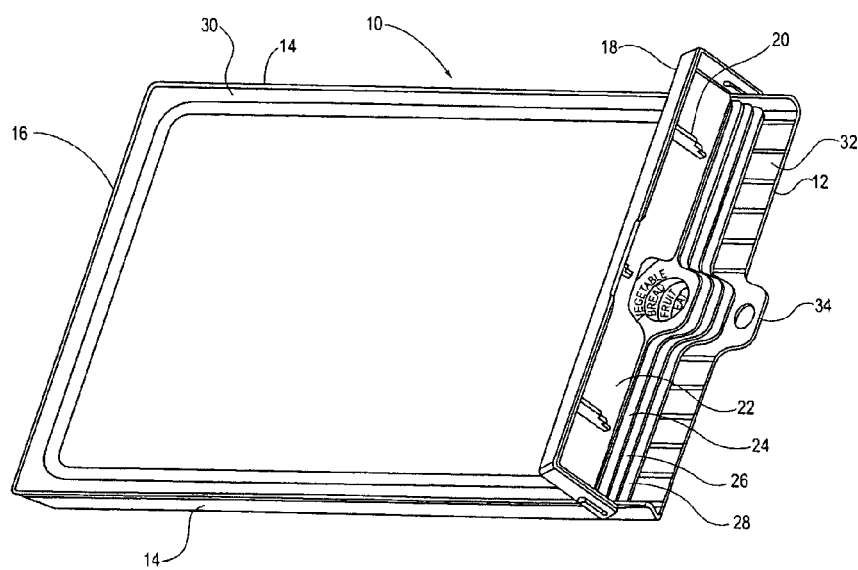
FIG. 1 is a top perspective view of a cutting board kit of the invention with a cutting board holder securing four cutting boards in close planar proximity and with a latch on the holder in an open position allowing selective removal of one or more of the cutting boards.

The cutting board kit of the invention includes a receiver capable of securely holding two or more cutting boards. Such secure holding allows a user to transport the cutting boards held therein as a single unit. The cutting boards are also held together as a single unit thereby allowing ease of location of cutting boards stored therein. The cutting boards may be removed from the receiver at the time desired by the user.

The receiver may include a frame with a distal wall and side walls attached to the distal wall. The side walls may include grooves to accept sides of the cutting boards and hold the cutting boards in a storage configuration until retrieved by a user of the kit. There may be disposed with the grooves one or more structures to secure the cutting boards in the receiver. These structures may include a ridge extending in a direction substantially perpendicular or perpendicular to the grooves, a rigid protrusion which may be formed during the fabrication process or a deformable protrusion which may be a malleable or a moveable structure, such as a spring loaded protrusion.

The receiver may also have a generally planar bottom surface with a receiving wall capable of contacting each of the cutting boards held within the receiver along three sides of each cutting board. The receiving wall may include two side walls attached perpendicular to the bottom surface, the side walls having proximal and distal ends, a distal wall attached at an obtuse angle to the bottom surface and attached to the distal ends of the two side walls. The bottom surface may have one or more ridges extending upwardly therefrom and running in parallel to the side walls. The one or more ridges may contact one of the cutting boards stored within the receiver. The bottom surface may also have a tab or extension, optionally defining a hole through the bottom surface, that may act as a handle or facilitate storage by hanging the cutting board kit when not in use.

The receiver may include a latch attached to the receiving wall or the frame. The latch may be capable of moving from a closed position in which the latch is capable of securing the cutting boards in the holder to an open position allowing a user to remove or replace one or more cutting boards in the holder. The latch may be pivotably attached to the side walls at or near the proximal ends of the side walls. The latch may cover at least some portion of one of the cutting boards held within the receiver when the latch is in the closed position. The latch may include protrusions capable of contacting and further securing one or more cutting boards in the holder. The latch may be secured in the closed position to prevent unintended exit of cutting boards from the receiver.

The cutting board kit of the invention includes two or more cutting boards. In some cases it may be useful to have a receiver capable of storing three, four, five, six, seven, eight, nine or ten cutting boards at once. The cutting boards may be of any shape susceptible of being held securely within a frame. The cutting boards may be rectangular and of virtually any dimension as may be convenient in food preparation. The cutting boards in any one kit may have the same dimensions or may vary slightly. In one embodiment, the distal wall of the receiver is attached at an obtuse angle with respect to the bottom surface so that cutting boards with the same length may be inserted to varying degrees thus allowing the cutting boards to present an offset configuration when inserted into the receiver. In another embodiment, cutting boards of rectangular shape have the same width, but vary slightly in length thus allowing the cutting boards to present an offset configuration when inserted the same distance into the receiver. The offset allows the user to easily determine which cutting boards are present in the receiver and further allows for selective removal of one cutting board without the need for disturbing the other cutting boards in their places.

The cutting boards may define a hole at one end of the board. The hole may be configured to allow for gripping or manipulation during removal of the cutting board from the receiver. The hole may also be configured to allow the user to grasp or secure the cutting board during use. The hole may also be configured to allow one or more cutting boards stored below the cutting board with the hole to be visible when the cutting boards are held within the receiver.

Cutting boards stored in the present kit may be uniquely identified in a way that allows each cutting board to be permanently dedicated for use with a certain food type. As noted above, permanent dedication of a cutting board to preparation of a given foodstuff may decrease risk of accidental food contamination by foodborne pathogens. For example, the cutting boards may be individually labeled with words the type of foodstuff which may be prepared on the cutting board (e.g. "Meat", "Fruit", "Vegetable", "Bread") or labeled with symbols portraying various foodstuffs or uses. Cutting boards may also be manufactured using different colors that may be suggestive of the foodstuff to be prepared thereon and that conform to a predetermined code.

Cutting boards may be made of any of number of materials, including molded polymers such as polyethylene (including high density polyethylene) and acrylics as well as wood, metal, glass or other materials. Cutting boards may also have a variety of surfaces and surface configurations that may be suited to or enhance operations in preparation of one or more foodstuffs. In the case of meats, produce and other foods in which liquids are emitted by the foodstuff during slicing or other operations, a cutting board may define a cavity on the food preparation surface to aid in collection of such liquid and preventing such liquid from spilling off of the cutting board.

A user of a cutting board holder according to the present invention may view two or more cutting boards securably stored within the holder. The user may open a latch thus allowing one or more selected cutting boards to be removed. The user may then remove one or more of the selected cutting boards and proceed with one or more food processing steps. Upon completion of the food processing steps or after food preparation is complete, the cutting boards may be cleansed in accordance with their use. For example, a cutting board used to slice bread may need only to be washed lightly with a moistened towel while a cutting board used in preparation of raw meat may be thoroughly cleansed in a dishwasher. Upon completion of the cleansing step, the one or cutting boards may be returned to the holder and securably stored once again in the holder by closing the latch.

Further understanding of the present invention may be gained by reference to the enclosed figures. FIG. 1 shows a cutting board kit of the invention (10) with four cutting boards (22, 24, 26, 28) inserted into a receiver (12). Receiver (12) comprises rectangular bottom surface (32) and walls (14, 16). Peripheral walls (14) are generally parallel to each other and contact the periphery of bottom surface (32) along most of the length of the long sides. Distal wall (16) is contiguous with distal ends of peripherals walls (14) and with distal end of bottom surface (32). Cutting boards (22, 24, 26, 28) are shown inserted between peripheral walls (14) and also in contact with distal wall. Latch (18) is capable of moving from an open position to a closed position. Latch (18) is shown in an open position in FIG. 1 that allows insertion or removal of cutting boards (22, 24, 26, 28) into or from receiver (12). Protrusions (20) are present on latch (18) and contact one or more cutting boards when latch (18) is in the closed position to prevent movement by the cutting boards within the receiver. Cutting boards (22, 24, 26, 28) may define a cavity bounded by a peripheral wall (30) in which liquids, crumbs and small portions of food stuffs are retained during use of the cutting board. Variations in the shape of the cavity, the depth of the cavity.

Figure 2:
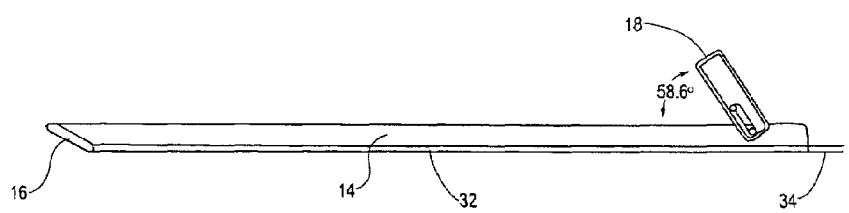
FIG. 2 is a side elevation view of the cutting board kit of FIG. 1.

FIG. 2 shows the cutting board kit (10) of FIG. 1 in a side view with latch (18) in an open position. Distal wall (16) is attached to bottom surface (32) at an obtuse angle, allowing cutting boards of the same length to be presented in a manner allowing selective removal of any of the cutting boards (22, 24, 26, 28) when latch (18) is in the open position. Handle (34) is an extension or tab extending from bottom surface (32) and defines a hole therethrough.

Figure 3:
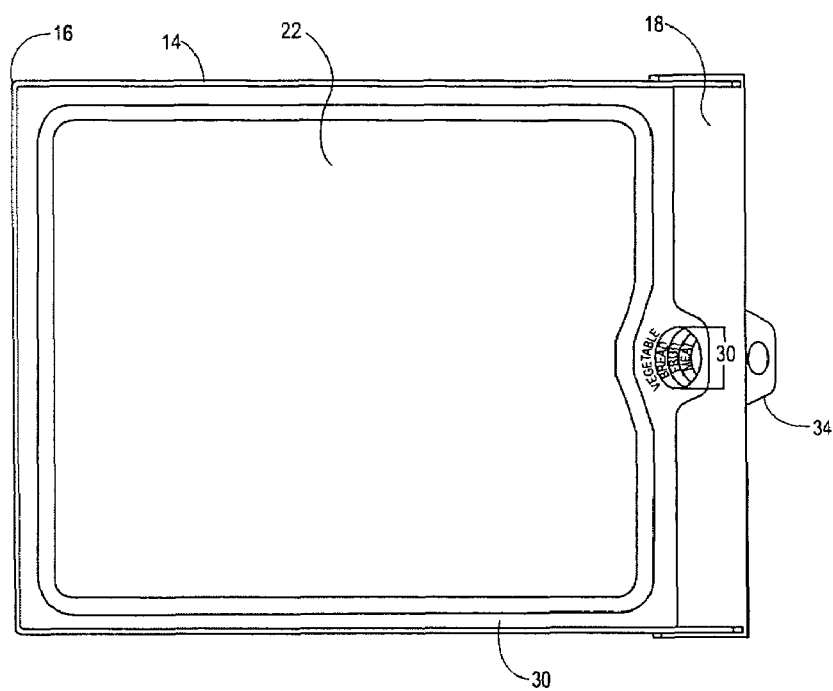
FIG. 3 is a top plan view of the cutting board kit of FIG. 1 with the latch in the closed position securing the cutting boards in place.

FIG. 3 shows the cutting board kit of FIG. 1 in a top view with latch (18) in a closed position. In the present embodiment, latch (18) in the closed position engages cutting board (22) to prevent movement thereof.

Figure 4:
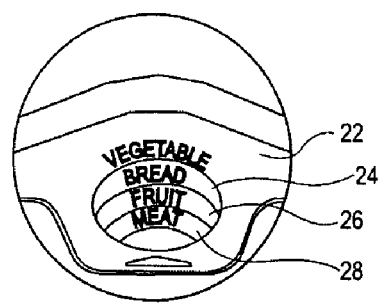
FIG. 4 is a cutout from FIG. 3 showing the individually labeled cutting boards held within the cutting board holder.

FIG. 4 shows a cutout view of FIG. 3 showing word labels on four cutting boards (22, 24, 26, 28) and showing one way in which a portion of each of the cutting boards is visible when the cutting boards are disposed in the receiver and the latch is in the closed position. In this embodiment, each cutting board defines a hole through which the cutting board underneath is visible. Numerous variations on the shape and placement of the hole are possible while still accomplishing the function of allowing the user to easily determine which cutting boards are still held in the receiver, even when the latch is in the closed position.

What is claimed is:

1. A cutting board kit, comprising:
   a cutting board holder, the holder comprising a receiver capable of securely storing two or more cutting boards in close proximity, the receiver comprising a frame adapted to receive the two or more cutting boards and the frame further comprising a distal wall having first and second ends, a first side wall attached to the first end and a second side wall attached to the second end and wherein the side walls define grooves for accepting side edges of the two or more cutting boards;
   two or more cutting boards secured within the holder wherein each of the cutting boards comprises an identifier permanently designating each cutting board for use with a specific type of food product; and
   a latch, the latch pivotably attached to the first side wall and to the second side wall and the latch capable of moving from a closed position in which the latch is capable of securing the cutting boards in the receiver to an open position allowing a user to remove or replace one or more cutting boards in the receiver.

2. The cutting board kit of claim 1, wherein the latch comprises one or more protrusions capable of contacting and securing one or more cutting boards in the receiver.

3. The cutting board kit of claim 2, wherein a portion of each of the cutting boards is visible when the cutting boards are secured in the receiver.

4. A cutting board kit, the kit comprising:
   two or more generally planar cutting boards;
   a cutting board holder comprising a receiver, the receiver having a generally planar bottom surface and a receiving wall attached to the generally planar bottom surface and capable of contacting each of the cutting boards along three sides of each cutting board; and
   a latch pivotably attached to the receiving wall and capable of moving from an open position wherein the generally planar cutting boards can be removed from or inserted into the receiver and a closed position in which the latch contacts a fourth side of each of the cutting boards and prevents removal of cutting boards from the receiver or insertion of cutting boards into the receiver.

5. The cutting board kit of claim 4, wherein the cutting board kit comprises three generally planar cutting boards.

6. The cutting board kit of claim 5, wherein the cutting board kit comprises four generally planar cutting boards.

7. The cutting board kit of claim 6, wherein at least a portion of each of the cutting boards is visible when the cutting boards are disposed in the receiver and the latch is in the closed position.

8. The cutting board kit of claim 7, wherein at least one cutting board is designated for use in conjunction with a specific food product and such designation is visible when the cutting board is disposed in the receiver.

9. The cutting board kit of claim 6, wherein the cutting boards are the same size.

10. The cutting board lit of claim 9, wherein the cutting boards are stored in a position offset from one another.

11. The cutting board kit of claim 9, wherein the receiving wall comprises two side walls having proximal and distal ends attached perpendicular to the bottom surface, wherein a distal wall is attached at an obtuse angle to the bottom surface and is attached to the distal ends of the two side walls, and wherein the latch is connected at the proximal end of each of the two side walls.

12. The cutting board kit of claim 4, wherein at least one of the cutting boards comprises an identifier permanently designating the at least one cutting board for use with a specific type of food product.

13. The cutting board kit of claim 12, wherein the at least one cutting board is marked with a symbol or a word indicating the specific type of food product.

* * * * *